United States Patent
Aoyama

(10) Patent No.: US 7,141,330 B2
(45) Date of Patent: Nov. 28, 2006

(54) SECONDARY BATTERY ACCOMODATION CASE

(75) Inventor: Tsutomu Aoyama, Fukushima (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 10/382,030

(22) Filed: Mar. 4, 2003

(65) Prior Publication Data

US 2003/0211382 A1 Nov. 13, 2003

(30) Foreign Application Priority Data

Mar. 5, 2002 (JP) ............................. 2002-059194

(51) Int. Cl.
*H01M 2/10* (2006.01)

(52) U.S. Cl. .................... 429/97; 429/99; 429/100

(58) Field of Classification Search ............... 429/96, 429/67, 99, 100, 97
See application file for complete search history.

(56) References Cited

U.S. PATENT DOCUMENTS

| | | | | |
|---|---|---|---|---|
| 5,543,248 A | * | 8/1996 | Dougherty et al. ..... | 429/100 X |
| 5,631,101 A | * | 5/1997 | Amero, Jr. ................. | 429/97 X |
| 6,045,936 A | * | 4/2000 | Fischl ........................ | 429/96 X |
| 6,068,946 A | * | 5/2000 | Zedell et al. ................ | 429/100 |
| 6,110,618 A | * | 8/2000 | Vacheron et al. ........... | 429/100 |
| 6,421,233 B1 | * | 7/2002 | Hong ..................... | 429/100 X |
| 6,444,352 B1 | * | 9/2002 | Herrmann et al. ............. | 429/96 |
| 6,465,123 B1 | * | 10/2002 | Baumann et al. ............. | 429/99 |
| 6,743,545 B1 | * | 6/2004 | Huang .......................... | 429/96 |

* cited by examiner

Primary Examiner—Stephen J. Kalafut
(74) Attorney, Agent, or Firm—Robert J. Depke; Rockey, Depke, Lyons & Kitzinger LLC

(57) ABSTRACT

The present invention is designed to provide a secondary battery accommodation case with improved exterior surface having no parting line in two or more exterior faces out of four exterior faces encircling the battery accommodation portion. It comprises a substantially rectangular bottom case 11 having a battery accommodation portion 18 for accommodating secondary batteries 13 and a top case 12 to be assembled with the bottom case 11 for closing the battery accommodation portion 18. In the assembled condition of the top case 12 and the bottom case 11, the exterior face of the top case 12 closing the secondary battery accommodation portion 18 is made equal to or lower than two or more open edges 15*a*~15*d* out of four exterior faces 11*b*~11*e* encircling the battery accommodation portion 18 in the bottom case 11.

7 Claims, 8 Drawing Sheets

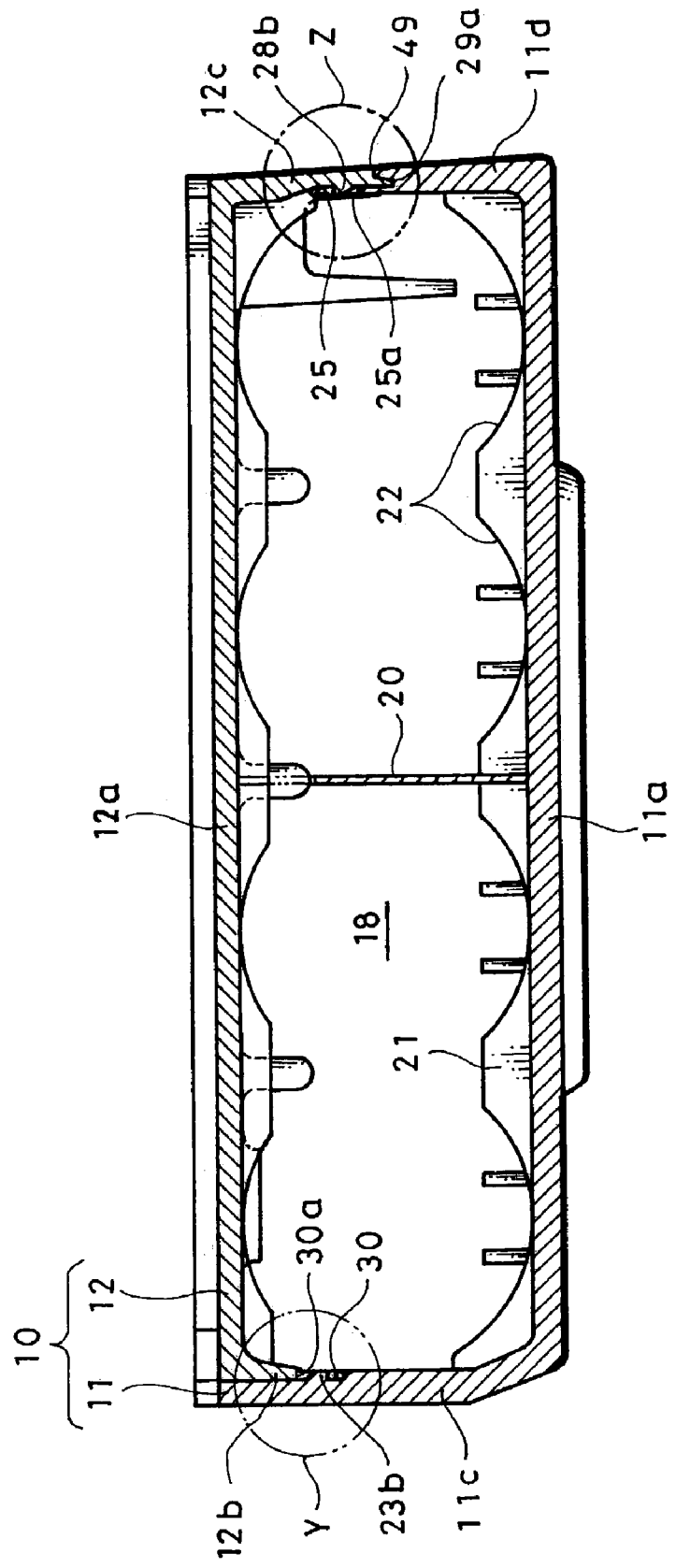

SECONDARY BATTERY ACCOMODATION CASE

This application claims priority to Japanese Patent Application Number JP2002-059194 filed Mar. 5, 2002, which is incorporated herein by reference.

BACKGROUND OF THE INVENTION

1. Field of the Invention

The present invention relate to a secondary battery accommodation case to be used as a power supply and the like for electronic apparatus such as, for example, a personal computer and the like for accommodating secondary batteries in a battery accommodation compartment formed by stacking a first case member and a second case member, more specifically to a secondary battery accommodation case that provides an exterior face having no parting or border lines of the first and second case members on three or more outer faces.

2. Description of the Related Art

An example of a conventional secondary battery accommodation case to be used as a power supply and the like for electronic apparatus such as a personal computer and the like has a construction as shown in FIG. 8. The secondary battery accommodation case 1 as shown in FIG. 8 comprises a substantially rectangular first case member 2 having a battery accommodation portion 4 for accommodating a plurality of secondary batteries therein and a second case member 3 to be mounted on the first case member 2 for closing the battery accommodation portion 4.

The first case member 2 comprises a rectangular bottom face portion 2a and a front face portion 2b, left and right side portions 2c, 2d and a rear face portion 2e standing upwardly from four sides of the bottom face portion 2a, thereby forming a recessed portion to defining a battery accommodation portion 4. A desired number of secondary batteries are accommodated in the battery accommodation portion 4. A second case member 3 is assembled with the first case member 2 in such a manner to close the battery accommodation portion 4.

In the first case member 2, heights of the left and right side portions 2c, 2d and the rear face portion 2e except the front face portion 2b out of the four portions 2b–2e which define exterior faces are made considerably lower than the height of the front face portion 2b. In other words, with respect to an opening side edge 5a, open side edges 5b, 5c and 5d of the other three sides are set considerably lower. Additionally, there are formed, at the open side edges 5b, 5c and 5d of the three sides, step portions 6 which are higher at the inner sides.

In accordance with the shape at the open side of the above-mentioned first case member 2, the second case member 3 is formed in a complementary shape. In other words, the second case member 3 comprises a top face portion 3a for closing the battery accommodation portion 4, and left and right face portions 3b, 3c and a rear face portion 3d depending continuously from the three sides of the top face portion 3a except the front face portion 3a. An open portion at the front face side of the second case member 3 is closed by an upper portion of the front face portion 2b of the first case member 2.

However, in such conventional secondary battery accommodation case 1, only one exterior face or the front face portion 2a out of four exterior faces encircling the battery accommodation portion 4 is made flat excluding the parting line, thereby including the parting lines at the border between the first case member 2 and the second case member 3 in right to left, or horizontal direction in the remaining three faces, that is, in the right and left side faces as well as the rear face. As a result, in a case when the secondary battery accommodation case 1 is used as a power supply for a personal computer, there is a drawback that a part of the exterior face including such parting line is easily exposed to human eyes, thereby providing awkward appearance.

SUMMARY OF THE INVENTION

The present invention is made in view of the above-mentioned drawback of the conventional secondary battery accommodation case. It is therefore an object of the present invention to provide a secondary battery accommodation case that has a face configuration excluding such parting line of the first case member and the second case member in two or more faces of the four faces encircling the battery accommodation portion, thereby improving the exterior faces easily exposed to human eyes and providing an excellent appearance.

In order to overcome the above-mentioned drawback and to achieve the above object, the secondary battery accommodation case according to the present invention as defined in the appended claim 1 comprises a substantially rectangular first case member having a battery accommodation portion for accommodating secondary batteries and a second case member to be assembled with the first case member for closing the battery accommodation portion, characterized in that, when the second case member is mounted on the first case member, an exterior face of the second case member closing the battery accommodation portion is made equal to or lower than open edges of two or more of the exterior faces out of four exterior faces encircling the battery accommodation portion.

The secondary battery accommodation case according to the present invention as defined in the appended claim 2 is characterized in that the first case member and the second case member provided with fix or stick means for locking the both cases by mounting the second case member on the first case member.

The secondary battery accommodation base according to the present invention as defined in the appended claim 3 is characterized in that the fix or stick means comprise projection portions provided on one of the first case member and the second case member and recessed portions provided on the other of the first case member and the second case member to engage with the respective projection portions.

The secondary battery accommodation case according to the present invention as defined in claim 4 is characterized in that the fix or stick means comprise resilient members provided on at least one of the first case member and the second case member and the resilient members are formed with the recessed portions or the projection portions.

The secondary battery accommodation case according to the present invention as defined in the appended claim 5 is characterized in that the fix or stick means are provided on one or more of the four open edges of the first case member and the second case member encircling the battery accommodation portion.

The secondary battery accommodation case according to the present invention as defined in claim 6 is characterized in that a channel or holes are formed on one of the case members and a ridge or projections to mate with the channel or the holes are formed on the other case member at the contact portions between the first case member and the second case member, and the channel or the holes and the ridge or the projections are mutually fused to joint the first case member and the second case member.

The secondary battery accommodation case according to the present invention as defined in claim 7 is characterized in that bonding means at the side face sides are mating configuration, while the inner bonding is made to secure by recess-projection fitting, bonding or engaging means by a channel or holes and a ridge or projections.

Because of the construction as described hereinabove, when the second case member is mounted on the first case member to close the battery accommodation portion in the secondary battery accommodation case according to the present invention as defined in claim 1, two or more exterior faces of the second case member out of the four exterior faces encircling the first case member are equal to or lower than the open side edges of the first case member. As a result, parting line (or border line) where the first case member and the second case member contact is not exposed to human eyes in two or more faces out of the four exterior faces, thereby improving appearance.

In the secondary battery accommodation case according to the present invention as defined in claim 2, the fix or stick means lock both case members together not to separate by simply mounting the second case member on the first case member.

In the secondary battery accommodation case according to the present invention as defined in claim 3, the fix or stick means are a combination of the projection portions and the recessed portions which are simple in construction but firmly secure the first case member and the second case member.

In the secondary battery accommodation case according to the present invention as defined in claim 4, because of the provision of the resilient members on at least one of the first case member and the second case member and forming the recessed portions or the projection portions defining one of the fix or stick means, the fix or stick means simplify the mounting operation of the second case member on the first case member and make the case members hard to disassemble after assembling them.

In the secondary battery accommodation case according to the present invention as defined in claim 5, the fix or stick means can be provided on one or more edge of the four open side edges of the first case member and the second case member encircling the battery accommodation portion, thereby firmly securing the second case member with the first case member.

In the secondary battery accommodation case according to the present invention as defined in claim 6, the channel or the holes are formed on one of the contact portions of the first case member and the second case member to be fused with the ridge or projections formed on the other of the contact portions, thereby integrating the first case member and the second case member by firmly jointing them.

BRIEF DESCRIPTION OF THE DRAWINGS

FIG. 5 is a magnified illustration to show the cross section view along the line X—X in FIG. 1;

DESCRIPTION OF THE PREFERRED EMBODIMENTS

Figure 1:
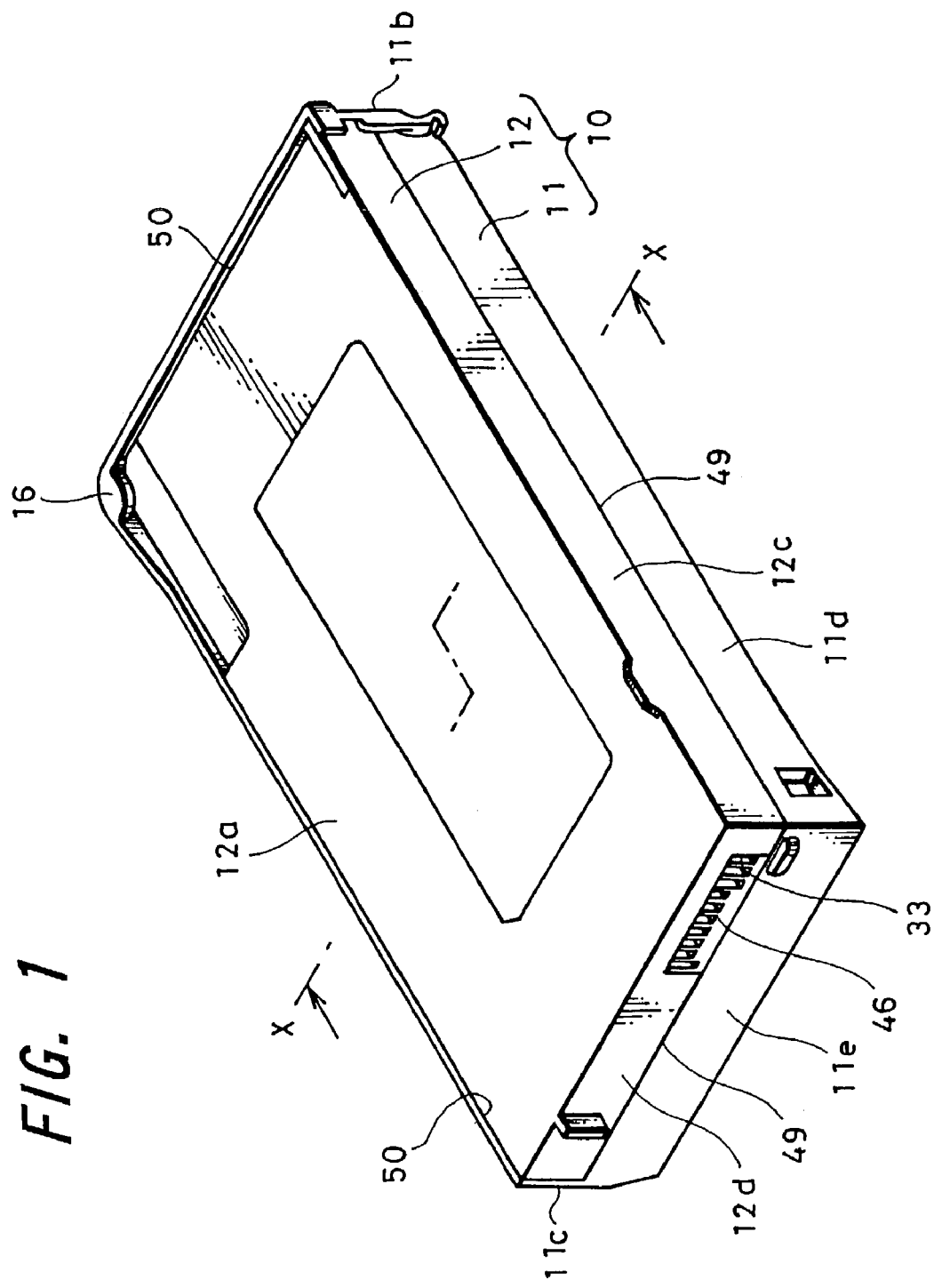
FIG. 1 is a perspective view of a first embodiment of the secondary battery accommodation case according to the present invention.
Figure 2:
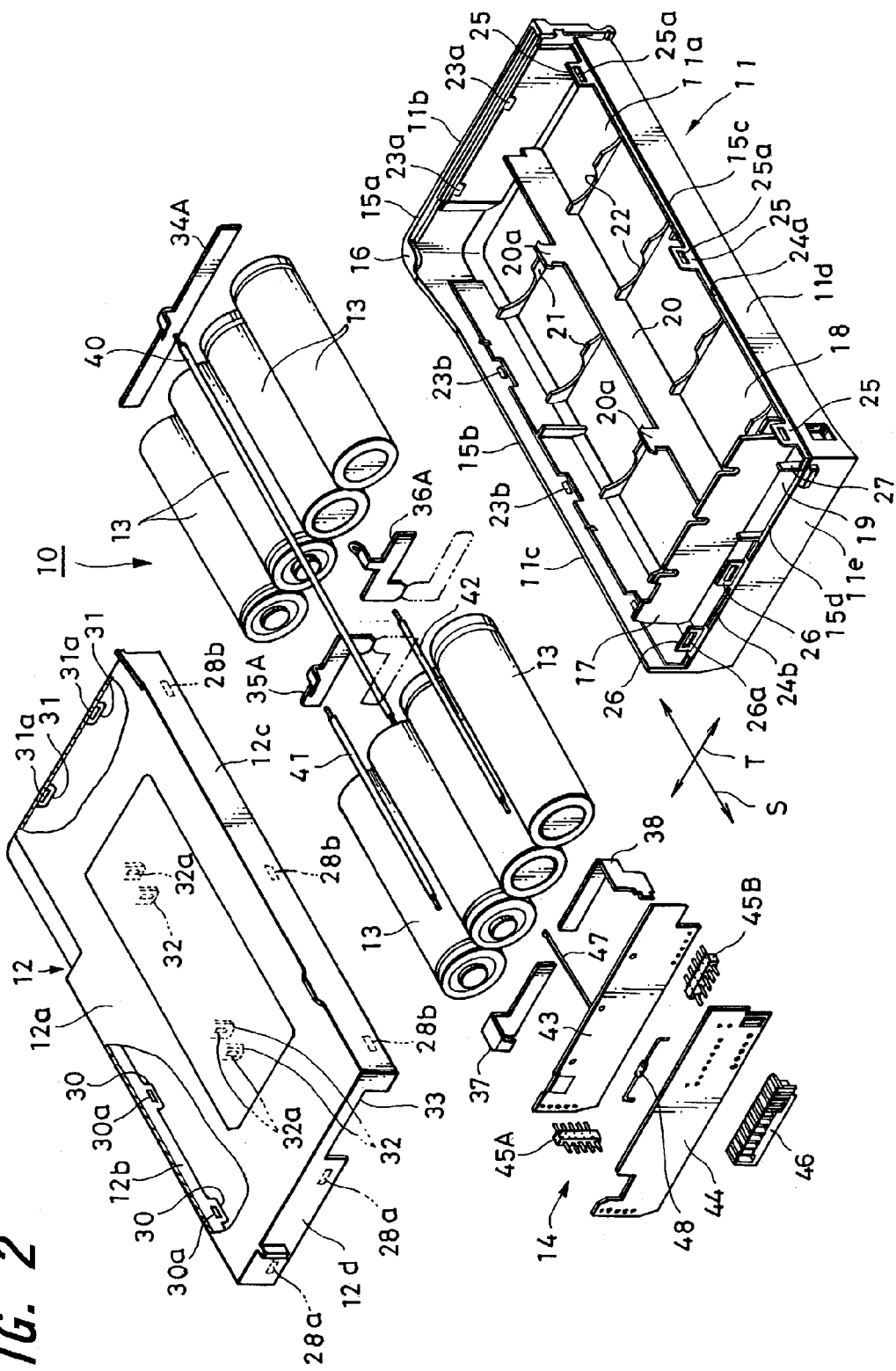
FIG. 2 is an exploded perspective view of the first embodiment of the secondary battery accommodation case according to the present invention in which eight secondary batteries are accommodated.
Figure 3:
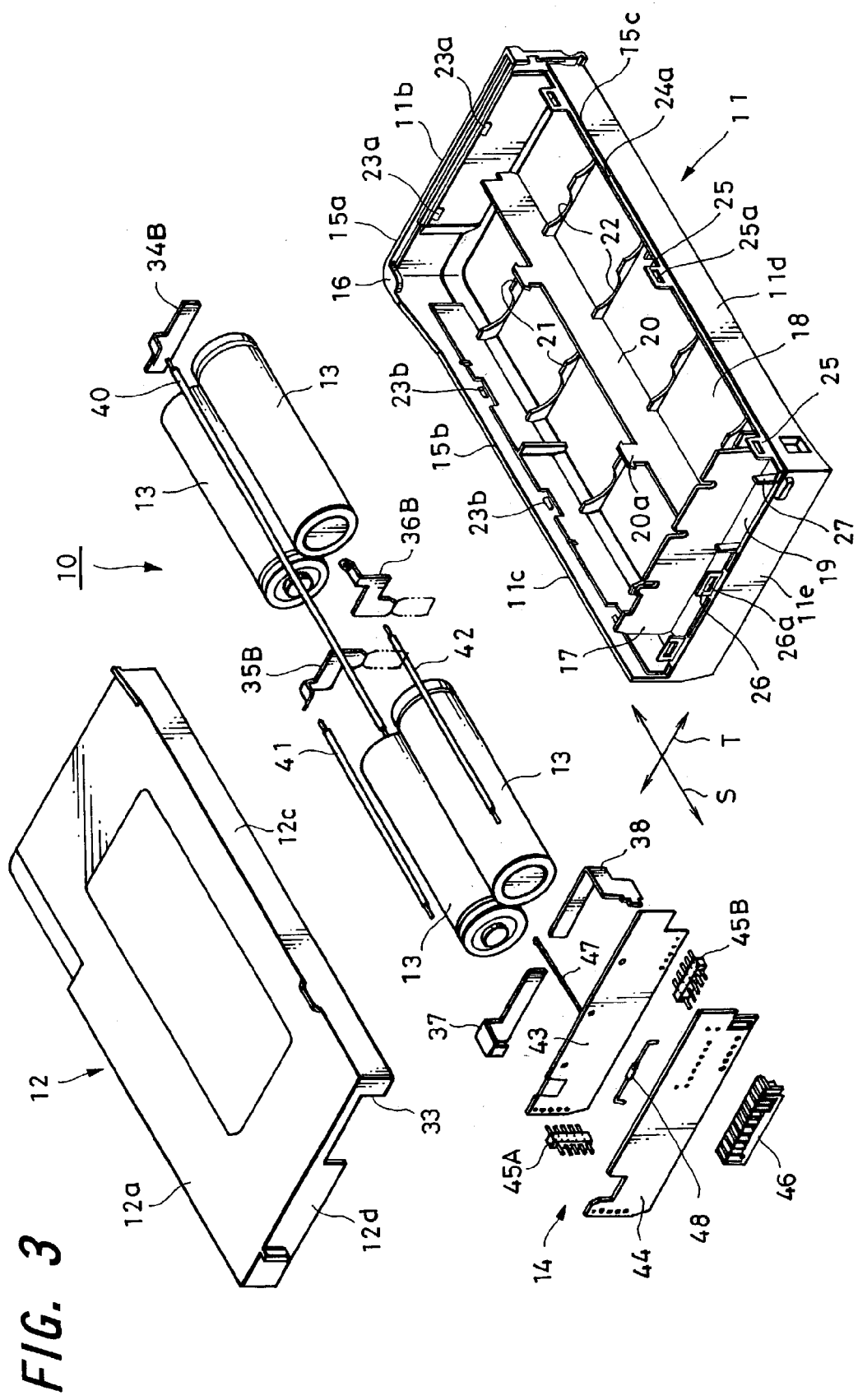
FIG. 3 is an exploded perspective view of the first embodiment of the secondary battery accommodation case according to the present invention in which four secondary batteries are accommodated.
Figure 4:
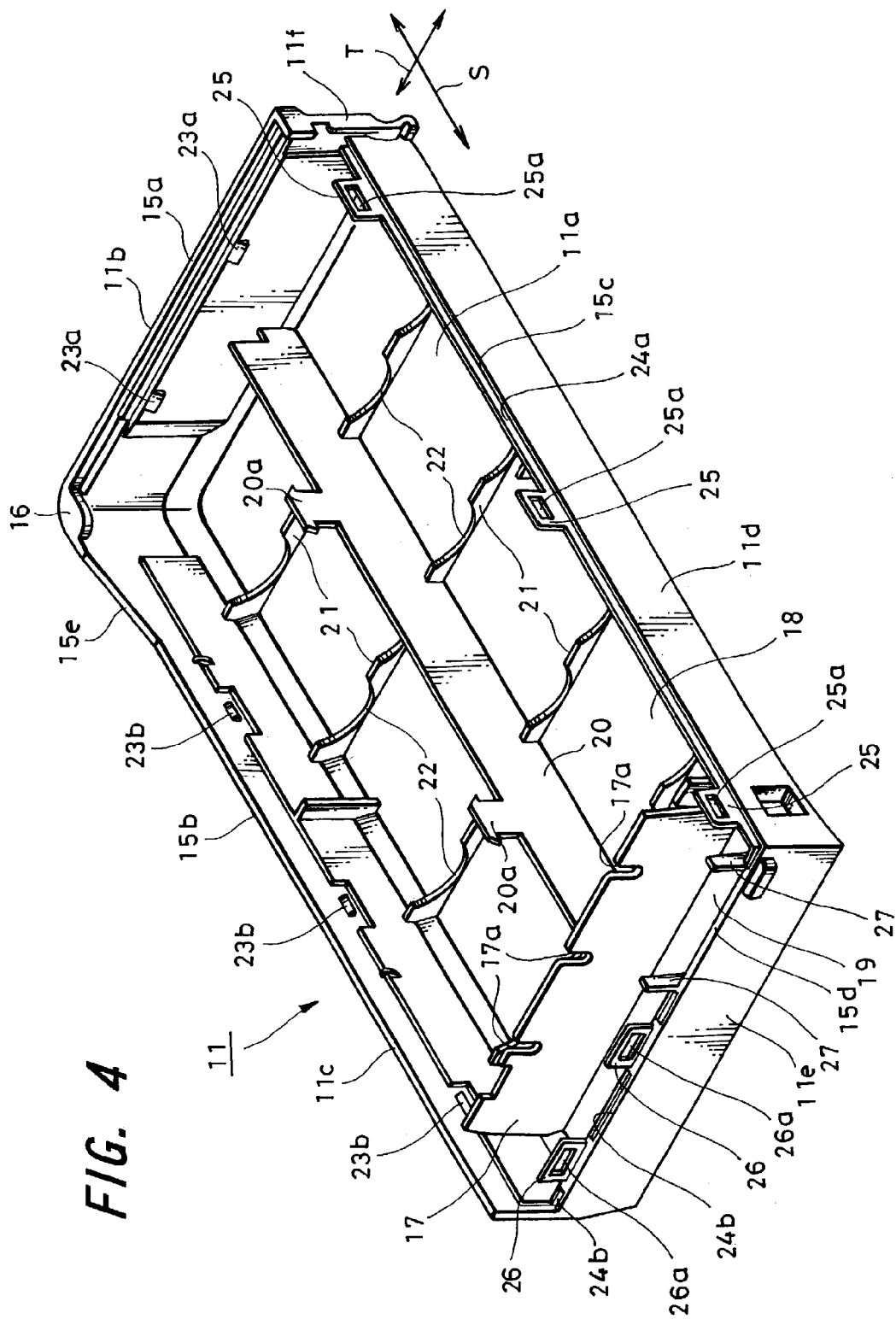
FIG. 4 is a magnified perspective view illustrating the first case member of the secondary battery accommodation case as shown in FIG. 1.
Figure 6A:
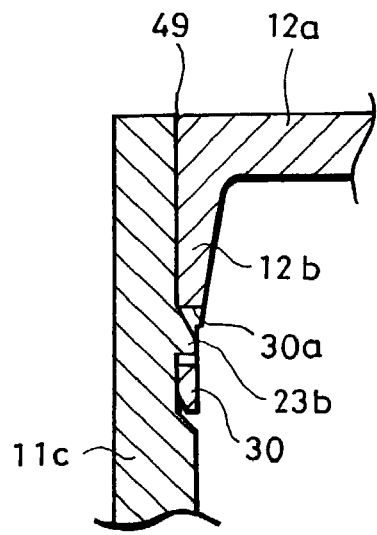
FIG. 6 is magnified views of important portions in FIG. 5, wherein A is a magnified cross section view of the portion Y and B is a magnified cross section view of the portion Z.
Figure 6B:
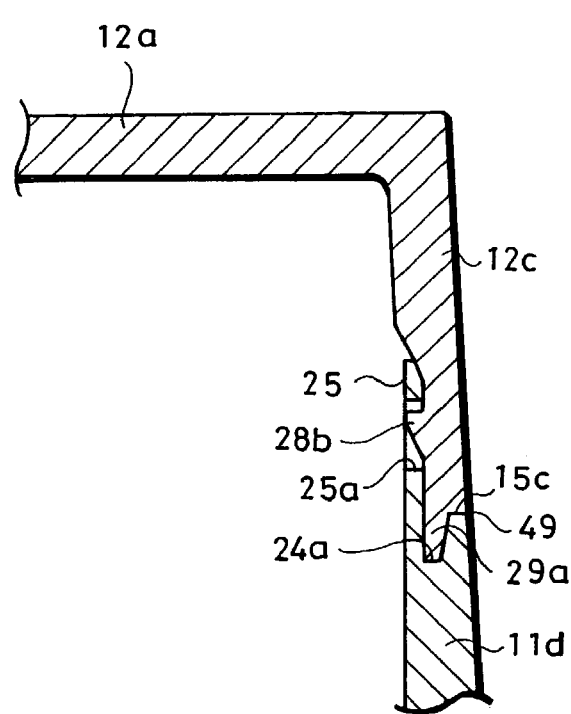
Figure 7:
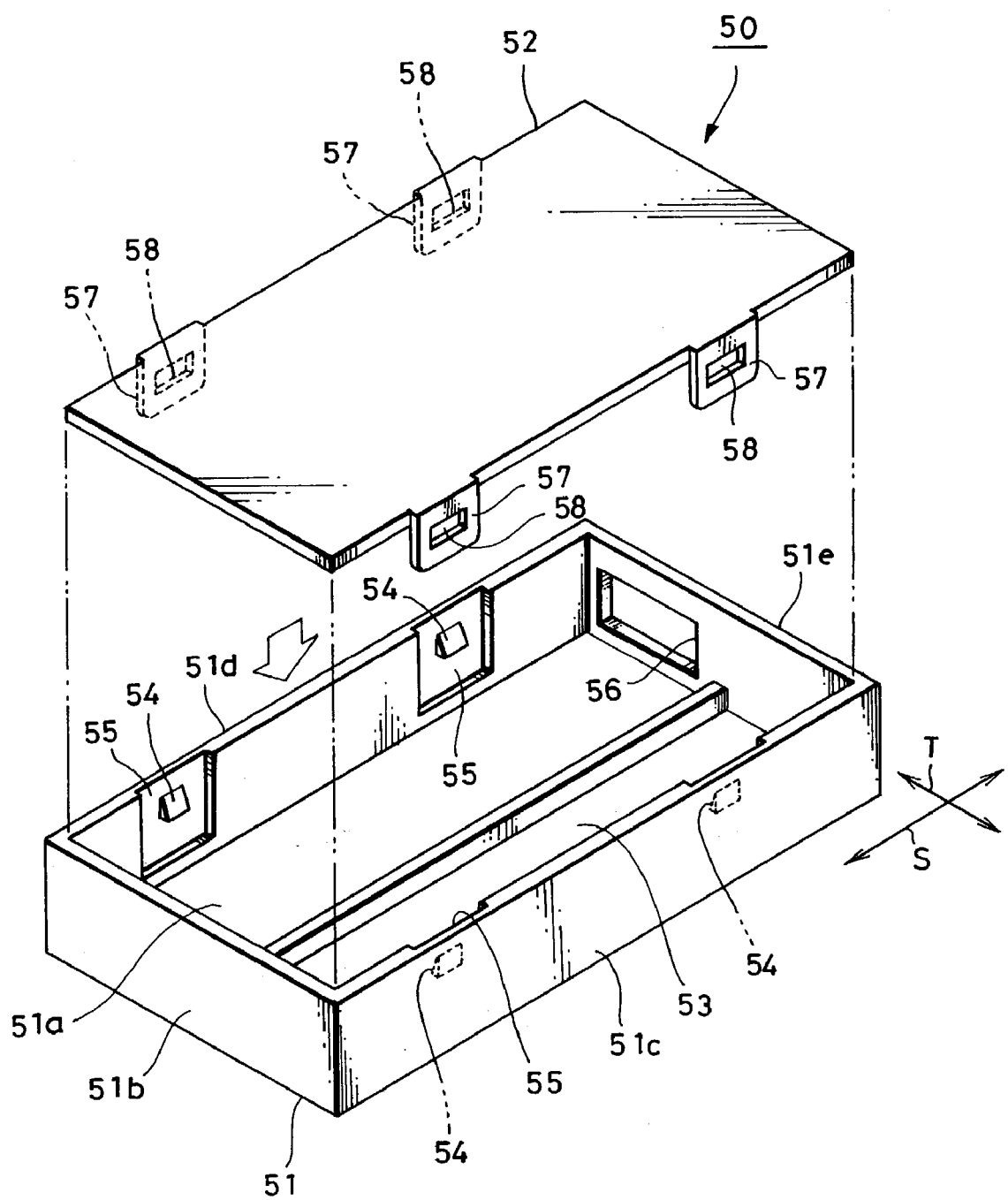
FIG. 7 is an exploded perspective view to show a rough construction of a second embodiment of the secondary battery accommodation case according to the present invention.
Figure 8:
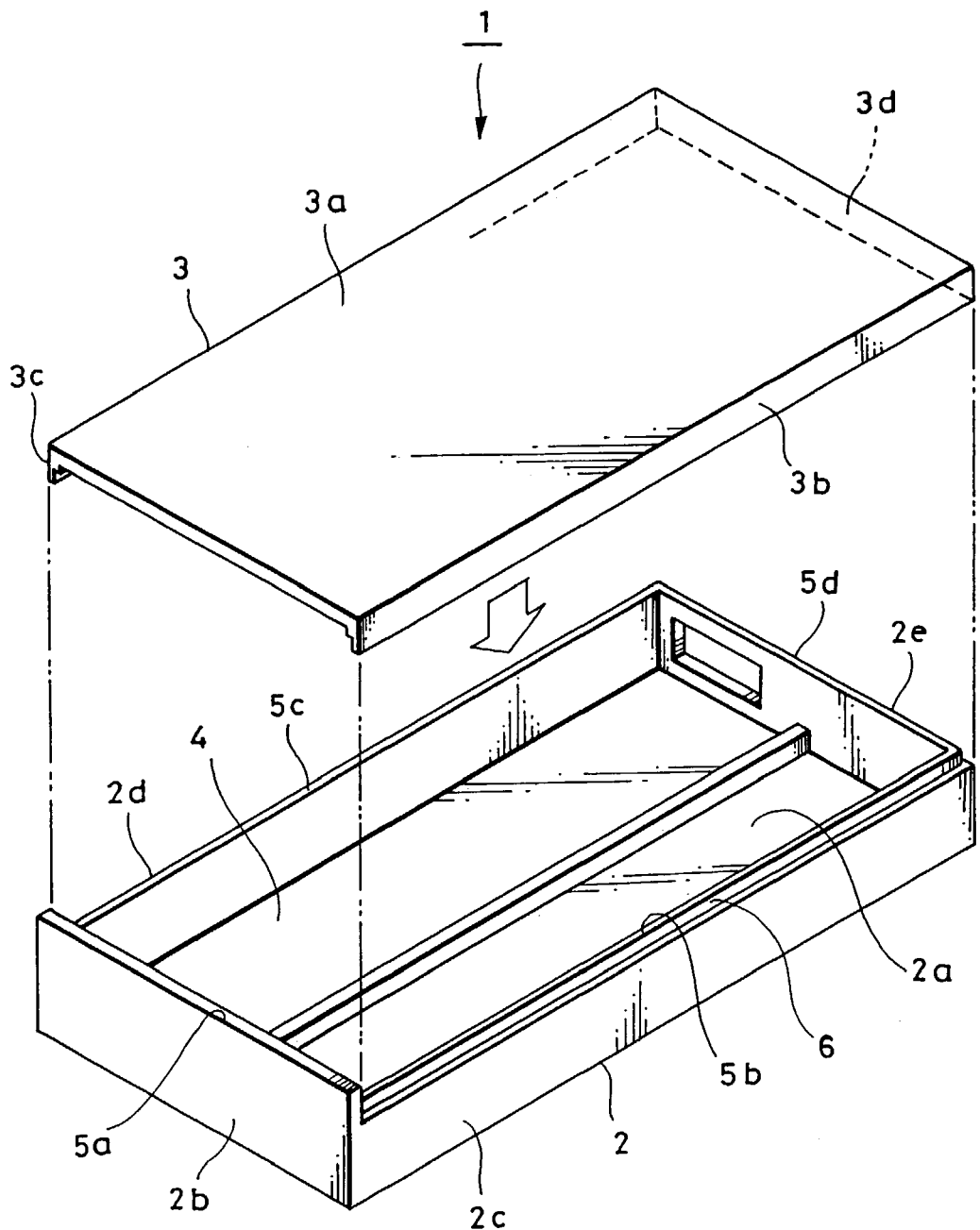
FIG. 8 is an exploded perspective view to show a rough construction of a conventional secondary battery accommodation case.

Now, preferred embodiments of the present invention will be described hereunder by reference to the accompanying drawings. FIG. 1 through FIG. 7 show embodiments of the present invention. Namely, FIG. 1 is a perspective view of a first embodiment of the secondary battery accommodation case according to the present invention, FIG. 2 is an exploded perspective view for accommodating eight secondary batteries in FIG. 1, FIG. 3 is an exploded perspective view for accommodating four secondary batteries in FIG. 1, FIG. 4 is a magnified perspective view of the first case member in FIG. 2 and the like, FIG. 5 is a cross section view along the line X—X in FIG. 1, FIG. 6 is magnified partial views in FIG. 5 in which A is the portion Y and B is the portion Z, FIG. 7 is an exploded perspective view of a second embodiment of the secondary battery accommodation case according to the present invention.

As shown in FIG. 1 through FIG. 3, the secondary battery accommodation case 10 according to a first embodiment of the present invention comprises a bottom case 11 which is one example of a first case member, a top case 12 which is an example of a second case member and the like. Accommodated in the secondary battery accommodation case 10 are a plurality of secondary batteries 13 and a control circuit 14 for charge and discharge control of the secondary batteries 13.

As shown in a magnified scale in FIG. 4, the bottom case 11 is rectangular in plan view and is substantially rectangular box member open at the top. Described more in detail, the bottom case 11 has a bottom face portion 11a which is rectangular in plan view and a front face portion 11b, left and right side face portions 11c, 11d and a rear face portion 11e standing up continuously from four sides of the bottom face portion 11a. The front face portion 11b is set to be the highest, the right side face portion 11c is set slightly lower than the front face portion 11b, and the remaining left side face portion 11d and the rear face portion 11e are set equal to each other and the lowest which is substantially ½ of that of the front face portion 11b.

Accordingly, an upper edge 15a at the open end of the front face portion 11b is located at the highest position, an upper edge 15b of the right side face portion 11c is the second highest position, and upper edges 15c, 15d of the left side face portion 11d and the rear face portion 11e are at the lowest position. Additionally, the upper edge 15a of the front face portion 11b and the upper edge 15b of the right side face portion 11c are made continuous by way of a gentle slope portion 15e. An eaves portion 16 is provided at the continuous portion of the upper edges 15a and 15b in order to prevent the top case 12 from rising.

There is provided in the recessed portion surrounded by the front face portion 11b, the left and right side face portions 11c, 11d and the rear face portion 11e a lateral isolation wall 17 for separating the recessed portion in the longitudinal direction S. The lateral isolation wall 17 separates the recessed portion into a battery accommodation portion 18 for accommodating the secondary batteries 13 and a circuit accommodation portion 19 for accommodating a control circuit 14.

Also provided in the battery accommodation portion 18 is a longitudinal isolation wall 20 for separating in the width direction T. The longitudinal isolation wall 20 is provided with a plurality (two in this particular example) of upwardly projecting engaging members 20a which are one of the fix or stick means at a desired spacing. Each engaging member 20a is provided with claws extending at both sides in the longitudinal direction S at the upper end portion.

In right and left battery accommodation portions separated by the longitudinal isolation wall 20 of the bottom case 11, there are provided a plurality (four in this particular example) of rib portions 21 for separating in the longitudinal direction S at a desired spacing. And each rib portion 21 is formed with arc-shaped cut-out portions 22 for the purpose of preventing secondary batteries 13 from rolling, thereby stably supporting them.

Moreover, there are provided a plurality (two in this particular example) of locking claws 23a which are second example of one of the fix or stick means on the inner face of and near the upper edge of the front face portion 11b at a desired spacing. Similarly, on the inner surface of and near upper edge of the right side face portion at a desired spacing in the longitudinal direction, there are provided a plurality (three in this particular example) of locking claws 23b which are projection portions acting as one of the fix or stick means. These locking claws 23a, 23b are projections of substantially triangle in cross section to extend more toward the bottom as best shown in FIG. 6A.

On the other hand, there are provided on the upper edge of the left side face portion 11d a continuous V-shaped channel 24a in the longitudinal direction S. At the upper edge inside the channel 24a, there are a plurality (three in this particular example) of resilient members 25 having desired resiliency at a desired spacing in the longitudinal direction S. Each resilient member 25 is provided with a locking hole 25a, a first example of a recess which defines the other of the fix or stick means. It is to be noted that the front face portion 11b is provided with an extending portion 11f extending toward the left side face portion 11d.

On the other hand, there are provided on the upper edge of the rear face portion 11e a plurality of V-shaped channels (or holes) 24b having a suitable length in the width direction T. Also, there are provided a plurality (two in this particular example) of resilient members 26 having desired strength at the inner upper edge of the channels 24b with desired spacing in the width direction T. Each resilient member 26 is provided with a locking hole 26a or a recess which defines the other of the fix or stick means. Furthermore, a pair of supporting projections 27, 27 are provided at one side of the rear face portion 11e in the width direction T for supporting a connector which will be described hereinafter.

The top case 12 is designed to mate on the upper surface of the bottom case 11 as shown in FIG. 2, and FIG. 3 and is a lid member which is rectangular in plan view. Described more in detail, the top case 12 has a top face portion 12a which is rectangular in plan view, left and right side face portion 12b, 12c and a rear face portion 12d continuously depending from three sides of the top face portion 12a except the front. Heights of the left and right face portions 11c, 11d and the rear face portion 11e of the bottom case 11 are set to compensate for different heights of the left and right side face portions 11c, 11d and the rear face portion 11e of the bottom case 11.

By completely assembling the top case 12 in alignment with the recessed portion of the bottom case 11, the edge at the front face side of the top face portion 12a of the top case 12 abuts against the inner surface of the front face portion 11b of the bottom case 11. Simultaneously, the bottom edge of the left side face portion 12c of the top case 12 abuts against the upper edge 15c of the left side face portion 11d of the bottom case 11, and the bottom edge of the rear face portion of the top case 12 abuts against the upper edge 15d of the rear face portion 11e of the bottom case 11. At this time, the surface of the top face portion 12a of the top case 12 is set equal to the height of the upper edge 15b of the right side face portion 11c of the bottom case 11.

Provided on the inner surface near the bottom end of the rear face portion 12d of the top case 12 are a plurality (two in this particular example) of locking claws 28a at a desired spacing in the width direction T. The locking claws 28a define projection portions which are the other of the fix or stick means similar to the above-mentioned locking claws 23a, 23b. And similar projecting locking claws 28b are provided at a desired spacing in the longitudinal direction T on the inner surface near the bottom edge of the left side face portion 12c. Similarly, these locking claws 28b form triangle projection portions in cross section projecting more toward the bottom as shown in FIG. 6B.

Additionally, there is provided a continuous V-shaped ridge 29a at the bottom edge of the left side face portion 12c of the top case 12 in the longitudinal direction S. When assembled, the ridge 29a is mated with the channel 24a provided at the upper edge of the left side face portion 11d of the bottom case 11. On the other hand, in the bottom edge of the rear face portion 12d of the top case 12, there are provided a plurality of V-shaped ridges (or ribs) having a suitable length in the width direction T. When assembled, the ridges mate with the channel 24b in the upper edge of the rear face portion 11e of the bottom case 11.

Also, there are provided a plurality (three in this particular example) of resilient members 30 having suitable resilient strength in the longitudinal direction S of the right side face portion 12b of the top case 12 at a desired spacing. Each resilient member 30 is formed with a locking hole 30a similar to the above-mentioned locking holes 25a, 26a defining a recessed portion which is the other of the fix or stick means. And on the front face side end of the top face portion 12a of the top case 12, there are provided a plurality (two in this particular example) of depending resilient members 31 having suitable resiliency. Each resilient member 31 is formed with a locking hole 31a defining a recessed portion which defines the other of the fix or stick means.

Moreover, on the inner face of the top face portion 12a of the top case 12, there are provided plural pairs (two pairs in this particular example) of resilient gripping members 32 to be mated with the above-mentioned engaging members 20a of the bottom case 11 at a suitable spacing in the longitudinal direction S. Each resilient gripping member 32 is formed with a locking hole 32a defining a recessed portion which defines the other of the fix or stick means. It is to be noted that a cut-out 33 is formed at one side in the width direction T of the rear face portion of the top case 12 to mate with a connector which will be described hereinafter.

The locking holes 31a of the resilient members 31 provided on the front side of the top case 12 correspond to the locking claws 23a on the front face portion 11g of the above-mentioned bottom case 11, thereby constituting the fix or stick means at the front face side. Also, the locking holes 30a in the resilient members 30 provided on the right face portion 12b of the top case 12 correspond to the locking claws 23b of the right side face portion 11c of the bottom case 11, thereby constituting the fix or stick means at the right side face. And the locking claws 28b provided on the left side face portion 12c of the top case 12 correspond to the resilient members 25 at the left side face portion 11d of the bottom case 11, thereby constituting the fix or stick means at the left side face.

On the other hand, the locking claws 28a provided on the rear face portion 12d of the top case 12 correspond to the resilient members 26 on the rear face portion 11e of the bottom case 11, thereby constituting the locking means at the rear face side. Also, the pair of the resilient gripping members 32 on the top face portion 12a of the top cover 12 correspond to the pair of engaging members 20a at the longitudinal isolation wall 20 of the bottom case 11, thereby constituting the fix or stick means at the center portion. In this case, each engaging member 20a is disposed between the pair of resilient gripping members 32 so that the claws extending outwardly at both sides of the end portion engage with the locking holes 32a.

In this embodiment, the fix or stick means for firmly locking the bottom case 11 and the top case 12 are provided at all open side edges of the four faces 11b~11e encircling the battery accommodation portion 18 of the bottom case 11 as well as the center portion. Moreover, each fix or stick means at each of the open side edges and the center portion is provided at two or three locations. Therefore, the bottom case 11 and the top case 12 are firmly locked and integrated with each other, thereby disabling to unlock them.

It is to be noted that, in the above description of the bottom case, the shape of the bottom case 11 is "substantially rectangular" because it is not real rectangular but curved slightly downwardly at the end of the rear face portion 11e. This means that the bottom case 11 is enough if it is substantially rectangular, thus the bottom case 11 may be a real rectangular or may be bent at one or two corner or face portion.

The battery accommodation portion 18 in the above-mentioned bottom case 11 is constructed to accommodate cylindrical secondary batteries 13 in two steps each including four parallel batteries, thereby accommodating eight batteries in total. FIG. 2 shows such example of accommodating 8 secondary batteries 13. On the other hand, shown in FIG. 3 is an example of accommodating four secondary batteries 13. FIG. 3 is different from FIG. 2 only in the size of intermediate tabs 34A, 34B for interconnecting the secondary batteries 13, center tabs 35A, 35B and 36A, 36B but all other constructions are identical.

Disposed inside the battery accommodation portion 18 in the bottom case 11 are a pair of plus pole tab 37 and minus pole tab 38 disposed side-by-side at the side closer to the circuit accommodation portion 19, and the intermediate tab 34A or 34B. And disposed at the center portion in the longitudinal direction S are a pair of center tabs 35A, 36A or 35B, 36B disposed side-by-side. One end of a first lead wire 40 is connected to the center tab 34A or 34B, one end of a second lead wire 41 is connected to one center tab 35A or 35B, and one end of a third lead wire 42 is connected to the other center tap 36A or 36B.

The other end of each of the first lead wire 40~ third lead wires 42 extends to the circuit accommodation portion 19. In order to pass the lead wires 40~42, the lateral isolation wall 17 is formed with three slits at the upper end portion of an appropriate width corresponding to the size of each lead wire 40~42 at a suitable spacing in the width direction T.

The control circuit 14 to be accommodated in the circuit accommodation portion 19 comprises a battery side board 43 disposed at the battery side, a connector side board 44 to be disposed in parallel with the battery side board 43 with a predetermined gap between them, a plurality (two in this particular example) of pin headers 45A, 45B for interconnecting the both boards 43, 44, a connector 46 mounted on the connector side board 44 and the like. Each board 43, 44 has predetermined circuit patterns formed thereon and also has electronic devices such as a microcomputer for executing predetermined programs, memory devices, resistors, capacitors and the like mounted thereon.

Also connected to the battery side board 43 are the other ends of the first lead wire 40~ the third lead wire 42 as well as base ends of the plus pole tab 37 and the minus pole tab 38. Moreover, a thermistor 47 for detecting temperature inside the battery accommodation portion 18 is mounted on the battery sideboard 43. On the other hand, a temperature fuse 48 for temperature management at charging/discharging time of the secondary battery 13 accommodated in the battery accommodation portion 18 is mounted on the connector side board 44.

The battery side board 43 and the connector side board 44 are electrically connected to each other by the two pin headers 45A, 45B. The connector 46 is mounted on the connector side board 44 on one side at an upper portion and is mated with the cut-out 33 of the top cover 12 when assembling it, thereby exposing contact holes of the connector 46 from the cut-out 33 in the top case 12. For example, by connecting a plug of an electronic apparatus such as a personal computer and the like to the connector 46, the secondary battery accommodation case 10 can be used as a power supply for supplying auxiliary power in case of emergency and the like.

Material of the top case 12 and the bottom case 11 is, for example, polycarbonate (PC) but may be other engineering plastics or metal, wood or the like rather than plastic materials.

The secondary battery accommodation case 10 having the above-mentioned construction may be assembled, for example, in the following steps. The control circuit 14 is accommodated in the circuit accommodation portion 19 in the bottom case 11 and predetermined number of secondary batteries 13 are accommodated in the battery accommodation portion 18 in the bottom case 11. In this case, the necessary number of secondary batteries 13 are inserted into the battery accommodation portion 18 in the same direction in the right or left half but in opposite directions to each other in the right and left halves.

Subsequently, the top case 12 is placed on top of the upper opening of the bottom case 11 with slightly slanted relationship and the outer face of the right side face portion 12b of the top case 12 is in abutment against the inner face of the right side face portion 11c of the bottom case 11. At this time, the plurality of resilient members 30 provided on the right side face portion 12b of the top case 12 are faced to the plurality of locking claws 23b on the right side face portion 11c of the bottom case 11. Under this condition, the right side face portion 12b of the top cover 12 is pushed down to resiliently urge each of the resilient locking member 30 to deform, thereby permitting the locking claws 23*b* to override the respective resilient members 30 into engagement. This establishes locking the fix or stick means at the right side face portions between the bottom case 11 and the top case 12.

The foregoing steps bring the rear face portion 12*d* and the left side face portion 12*c* of the top case 12 close to the rear face portion 11*e* and the left side face portion 11*d* of the bottom case 11, respectively. As a result, the plurality of resilient members 31 provided on the top face portion 12*a* of the top case 12 are facing to the plurality of locking claws 23*a* provided on the inner face of the front face portion 11*b* of the bottom case 11. Also, the locking claws 28*a* provided on the rear face portion 12*d* of the top case 26 face to the plurality of resilient members 26 provided on the rear face portion 11*e* of the bottom case, respectively. Similarly, the plurality of locking claws 28*b* provided on the left side face portion of the top cover 12 face to the plurality of the resilient members 25 provided on the left side face portion 11*d* of the bottom case 11, respectively. And then the plurality of resilient gripping members 32 provided on the upper face 12*a* of the top case 12 face to the plurality of engaging members 20*a* provided on the longitudinal isolation wall 20 of the bottom case 11, respectively.

Subsequently, the left face portion 12*b* of the top case 12 is pushed down, thereby resiliently deforming the resilient members 25, 26 and 31, thereby permitting the corresponding locking claws 28*b*, 28*a* and 23*a* to override the resilient members 30, respectively. As a result, each of the locking claws 28*b*, 28*a* and 23*a* are engaged with the locking holes 25*a*, 26*a* and 31*a* provided on each of the resilient locking member 25, 26 and 31, respectively. Simultaneously, the engaging members 20*a* are inserted into the respective spaces between the pair of engaging members 32, thereby making the claws at the both sides to engage with each resilient gripping member 32. The above steps lock the fix or stick means at the front face portion, the left side face portion, the rear face portion and the center portion between the bottom case 11 and the top case 12, respectively.

The above steps joint the bottom case 11 and the top case 12 at substantially entire contact portions. Since each of the locking claws 23*a*, 23*b* and 28*a*, 28*b* of each fix or stick means is provided with latching projection or projections, the top case 12 can not be unlocked even by applying upward force, thereby preventing the bottom case 11 and the top case 12 from being disassembled.

In such mutually integrated bottom case 11 and the top case 12, is shown in FIG. 1, the faces exposing the parting line 49 at the abutment portions of the cases 11 and 12 are limited only to two faces, that is, the left side face portion and the rear face portion among the four side face portions encircling the battery accommodation portion 10 in the bottom case 11 and the other faces, that is, the front face portion and the right side face portion expose only the front face portion 11*b* and the right side face portion 11*c* as the entire exterior faces, respectively. This means that, according to the present embodiment, the parting line 49 appears in only two faces out of four side faces encircling the battery accommodation portion 18 of the bottom case 11, thereby providing excellent appearance.

If the secondary battery accommodation case having the above face configuration is utilized as a power supply integrally with an electronic apparatus such as, for example, personal computer and the like, the power supply improves the exterior appearance and provides an excellent appearance easily exposed to human eyes of such type of power supply.

It is to be noted that adhesive may be applied to the contacting portions between the bottom case 11 and the top case 12 for integrating them. If jointing means by an ultrasonic bonding technique is utilized, it is particularly advantageous in an economical point of view because there is no need to use adhesive and a secondary battery accommodation case having smooth jointing portion can be obtained. In this case, ultrasonic bonding can be achieved easily and reliably between the two plastic parts by the use of a combination of the channels 24*a* in the bottom case 11 and the ridges 29*a* on the top case 12.

FIG. 7 shows a second embodiment of the secondary battery accommodation case according to the present invention. The secondary battery accommodation case 50 is constructed so that a second case member is assembled with a first case member only in the above direction and no parting line is exposed on any of the four exterior faces encircling a battery accommodation portion 53 in the first case member.

The secondary battery accommodation case 50 comprises a case main body 51 representing a first case member of the second embodiment and a case lid member 52 representing a second case member of the second embodiment. The case main body 51 comprises a bottom face portion 51*a* which is rectangular in plan view and a front face portion 51*b*, left and right side face portions 51*c*, 51*d* and a rear face portion 51*e* standing continuously upwardly from the four sides of the bottom face 51*a*, thereby defining the battery accommodation portion 53 open at the top face.

The left and right side face portions 51*c*, 51*d* are provided with plurality (two each in this particular example) of projecting locking claws 54 which define one of fix or stick means at a suitable spacing in the longitudinal direction of the case main body 51. A relief portion 55 is formed about each of the locking claw 54 to project each locking claw 54. Represented by the reference numeral 56 is a through-hole for mounting a connector 56.

The case lid member 52 comprises only a top face portion which is rectangular in plan view and sized equal to the battery accommodation portion 53. There are provided 4 resilient members 57 on the opposed two sides in the width direction T of the case lid member 52. Each of the resilient members 57 has suitable resiliency to deform to a certain extent for ease of engagement the corresponding locking claw 54. And each resilient member 57 is provided with a locking hole 58 for engaging with the respective locking claw 54.

According to this embodiment, the case lid member 52 is placed above the case main body 51 to be placed down onto the battery accommodation portion 53, thereby making the resilient members 57 to be placed on the four locking claws 54, respectively. Subsequently, the case lid member 52 is pushed down so that the locking claws 54 override the respective resilient members 57 for installing the case lid member 52 onto the case main body 51. As a result, the four locking claws 54 respectively engage with the locking holes 58 provided on the four resilient members 57, thereby jointing the case lid member 52 with the case main body 51 by way of fix or stick means over substantially the entire contacting portions.

In the case main body 51 and the case lid member 52 which are jointed in the above manner, the face in which the parting line is exposed is only the top face, thereby making all of the four faces encircling the battery accommodation portion 53 in the case main body 51 flat faces exposing no parting line at all. According to the this embodiment, all of the four side faces encircling the battery accommodation portion 53 in the case main body 51 do not expose the parting line, thereby providing an excellent exterior surface.

Although preferred embodiments of the present invention have been described hereinabove, it is to be noted that the present invention should not be restricted to such embodiments. Although the secondary batteries are described to be cylindrical in the above embodiments, the present invention can be applied not only to, for example, rectangular pole type secondary batteries but also to other batteries such as polymer secondary batteries using aluminum laminate film as an exterior material and other secondary batteries. Also, although the shape of the locking claws 23a, 23b, 28a, 28b as the projection portions is described as rectangular in cross section, they may take, for example, semispherical or other shapes. As apparent from the foregoing, various modifications may be made on the present invention without departing from its sprit and scope.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A secondary battery accommodation case comprising a substantially rectangular first case member having a main exterior surface, four side exterior surfaces, and a battery accommodation portion for accommodating secondary batteries, said secondary battery accommodation case further comprising a second case member to be assembled with said first case member for closing said battery accommodation portion, characterized in that, when said second case member is assembled with said first case member, a main exterior face of said second case member for closing said battery accommodation portion is made to become flush with or lower than upper edges of two or more of the side exterior surfaces out of the four side exterior surfaces of said first case member encircling said battery accommodation portion, and wherein an upper edge of a front face portion and an upper edge of a side face portion of the first case member are made continuous by way of a gentle slope portion, and an eaves portion is provided substantially where the two upper edges meet in order to prevent the second case member from disengaging the first case member once the two members are joined and further wherein the eaves portion engages a portion of the main exterior face of the second case member.

2. A battery accommodation case of claim 1, wherein said first case member and said second case member are provided with engaging means for locking said both cases by mounting said second case member on said first case member.

3. A secondary battery accommodation case of claim 2, wherein said engaging means comprise projection portions provided on one of said first case member and said second case member and recessed portions provided on the other of said first case member and said second case member to engage with said respective projection portions.

4. A secondary battery accommodation case of claim 3, wherein said engaging means comprise resilient members provided on at least one of said first case member and said second case member and said resilient members are formed with said recessed portions or said projection portions.

5. A secondary battery accommodation case of claim 2, 3 or 4, wherein said engaging means are provided on one or more edge of the four open edges of said first case member and said second case member encircling said battery accommodation portion.

6. A secondary battery accommodation case of claim 1, wherein a channel or holes arc formed on one of said case members and a ridge or projections to mate with said channel or holes are formed on the other case member at the contact portions between said first case member and said second case member, and said channel or said holes and said ridge or said projections are mutually fused to joint said first case member and said second case member.

7. A secondary battery accommodation case of claim 2, wherein engaging means at the side face sides have a mating configuration, while an inner engaging is made to secure the case members by one of a recess-projection fitting, bonding, or an engaging means by which a channel or holes engage with a ridge or projections.

* * * * *